United States Patent
Mise

(10) Patent No.: US 9,733,652 B2
(45) Date of Patent: Aug. 15, 2017

(54) APPARATUS CONTROL DEVICE, APPARATUS CONTROL SYSTEM, AND PROGRAM FOR CONTROLLING A HEATING-COOLING COMBINATINON APPARATUS BASED ON A METABOLIC HISTORY OF A USER

(71) Applicant: Panasonic Corporation, Osaka (JP)

(72) Inventor: Atsushi Mise, Aichi (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 558 days.

(21) Appl. No.: 14/388,070

(22) PCT Filed: Feb. 25, 2013

(86) PCT No.: PCT/JP2013/001054
§ 371 (c)(1),
(2) Date: Sep. 25, 2014

(87) PCT Pub. No.: WO2013/145541
PCT Pub. Date: Oct. 3, 2013

(65) Prior Publication Data
US 2015/0045981 A1  Feb. 12, 2015

(30) Foreign Application Priority Data
Mar. 29, 2012 (JP) ................. 2012-076396

(51) Int. Cl.
G01M 1/38 (2006.01)
G05D 23/19 (2006.01)
F24F 11/00 (2006.01)

(52) U.S. Cl.
CPC ............ *G05D 23/19* (2013.01); *F24F 11/006* (2013.01); *F24F 2011/0058* (2013.01); *F24F 2011/0064* (2013.01)

(58) Field of Classification Search
None
See application file for complete search history.

(56) References Cited

U.S. PATENT DOCUMENTS 4,502,290 A * 3/1985 Suzuki ................. F24F 11/0009
                                                    236/47
5,145,112 A   9/1992 Ueda
(Continued)

FOREIGN PATENT DOCUMENTS

JP    04-268146 A    9/1992
JP    05-215374 A    8/1993
(Continued)

OTHER PUBLICATIONS

Extended European Search Report for corresponding European Application No. 13767897.5 dated Jun. 2, 2015.
(Continued)

*Primary Examiner* — Adam Lee
(74) *Attorney, Agent, or Firm* — Renner, Otto, Boisselle & Sklar, LLP

(57) ABSTRACT

An apparatus control system includes a metabolic amount measurement device measuring a metabolic amount, and an apparatus control device controlling a heating-cooling combination apparatus. A control content storage unit stores thermal sensations and control contents of the heating-cooling combination apparatus. The metabolic amount measured by the metabolic amount measurement device is inputted to an input unit. A metabolic amount storage unit stores a history of the metabolic amount inputted to the input unit before. A calculation unit calculates the thermal sensation using the metabolic amount inputted to the input unit. A correction unit corrects the thermal sensation calculated by the calculation unit using the history of the metabolic amount stored in the metabolic amount storage unit. An apparatus control unit controls the heating-cooling combi-
(Continued)

nation apparatus according to a control content stored in the control content storage unit in association with the thermal sensation corrected by the correction unit.

13 Claims, 8 Drawing Sheets

(56) References Cited

U.S. PATENT DOCUMENTS

| | | | | |
|---|---|---|---|---|
| 5,751,916 | A * | 5/1998 | Kon | F24F 11/0009 700/299 |
| 2004/0167386 | A1 * | 8/2004 | Kasahara | A61B 5/0537 600/382 |
| 2008/0243027 | A1 | 10/2008 | Nakayama et al. | |
| 2010/0036533 | A1 * | 2/2010 | Masuda | F24F 11/0034 1/34 |
| 2010/0069782 | A1 * | 3/2010 | Icove | G01K 3/14 600/549 |
| 2010/0266723 | A1 * | 10/2010 | Bralley, III | G06F 19/3475 426/2 |
| 2012/0029369 | A1 * | 2/2012 | Icove | G01K 3/14 600/504 |

FOREIGN PATENT DOCUMENTS

| | | |
|---|---|---|
| JP | 05-215375 A | 8/1993 |
| JP | 05-248681 A | 9/1993 |
| JP | 06-265189 A | 9/1994 |
| JP | 06-347077 A | 12/1994 |
| JP | 2003-042508 A | 2/2003 |
| JP | 2008-241135 A | 10/2008 |
| JP | 2010-159887 A | 7/2010 |
| JP | 2010-249454 A | 11/2010 |
| JP | 2011-069601 A | 4/2011 |
| JP | 2011-202892 A | 10/2011 |

OTHER PUBLICATIONS

International Search Report for corresponding International Application No. PCT/JP2013/001054 mailed May 14, 2014.

Form PCT/ISA/237 for corresponding International Application No. PCT/JP2013/001054 dated May 14, 2014.

* cited by examiner

FIG. 2A

| INFORMATION RELATING TO ENVIRONMENT | ATMOSPHERIC TEMPERATURE |
| --- | --- |
| | MEAN RADIANT TEMPERATURE |
| | WIND SPEED |
| | RELATIVE HUMIDITY |
| INFORMATION RELATING TO HUMAN BEING | CLOTHING AMOUNT |
| | METABOLIC AMOUNT |

FIG. 2B

| PMV | THERMAL SENSATION |
| --- | --- |
| +3 | HOT |
| +2 | WARM |
| +1 | SLIGHTLY WARM |
| 0 | NEUTRAL |
| −1 | SLIGHTLY COOL |
| −2 | COOL |
| −3 | COLD |

APPARATUS CONTROL DEVICE, APPARATUS CONTROL SYSTEM, AND PROGRAM FOR CONTROLLING A HEATING-COOLING COMBINATINON APPARATUS BASED ON A METABOLIC HISTORY OF A USER

TECHNICAL FIELD

The present invention relates to an apparatus control device, an apparatus control system, and a program for controlling a heating-cooling combination apparatus.

BACKGROUND ART

Heretofore, when the thermal environment of a predetermined indoor space is not comfortable, the user of an air-conditioning apparatus changes the set temperature of the air-conditioning apparatus by operating a remote controller. In this case, the intention of the user can be directly reflected in the control of the air-conditioning apparatus.

However, there are users who will not operate the remote controller because operating the remote controller is troublesome, even though the thermal environment of the indoor space is not comfortable.

In view of this, as a means to make operating the remote controller unnecessary when controlling an air-conditioning apparatus, a system disclosed in JP 2010-249454A (hereinafter referred to as "Document 1") estimates the thermal sensation of the user using the six elements (atmospheric temperature, mean radiant temperature, a wind speed, relative humidity, a clothing amount, and a metabolic amount), and controls the air-conditioning apparatus.

However, since the conventional system described in Document 1 makes the metabolic amount constant value when guessing a thermal sensation of a user, the big difference had produced between the value of actual thermal sensation and estimated value.

SUMMARY OF INVENTION

The present invention has been made in view of the above-described problems, and an object of the present invention is to provide an apparatus control device, an apparatus control system, and a program, in which it is possible to reflect a thermal sensation of a user in the control of an heating-cooling combination apparatus while making remote controller operation by the user unnecessary.

An apparatus control device according to the present invention is configured to control a heating-cooling combination apparatus and used together with a metabolic amount measurement device configured to measure a metabolic amount. The apparatus control device includes a control content storage unit, an input unit, an operation unit, an apparatus control unit, and a metabolic amount storage unit. The control content storage unit is configured to store thermal sensations in association with control contents of the heating-cooling combination apparatus. The input unit is configured to receive input of the metabolic amount measured by the metabolic amount measurement device. The operation unit is configured to calculate a thermal sensation using the metabolic amount that is inputted to the input unit. The apparatus control unit is configured to control the heating-cooling combination apparatus according to a control content stored in the control content storage unit in association with the thermal sensation that is calculated by the operation unit. The metabolic amount storage unit is configured to store a history of the metabolic amount inputted to the input unit before. The operation unit includes a calculation unit and a correction unit. The calculation unit is configured to calculate the thermal sensation using the metabolic amount inputted to the input unit. The correction unit is configured to correct the thermal sensation calculated by the calculation unit using the history of the metabolic amount before change stored in the metabolic amount storage unit when the metabolic amount inputted to the input unit is changed.

Preferably, the apparatus control device further includes a detection information acquisition unit and a clocking unit. The detection information acquisition unit is configured to acquire detection information that denotes whether or not a person exists in an indoor space in which a thermal environment is changed by the heating-cooling combination apparatus. The clocking unit is configured to clock an elapsed time from a time at which a presence of the person in the indoor space is detected using the detection information acquired by the detection information acquisition unit. The correction unit is configured to correct the thermal sensation calculated by the calculation unit, using the history of the metabolic amount before change stored in the metabolic amount storage unit and the elapsed time clocked by the clocking unit when the metabolic amount inputted to the input unit is changed.

Preferably, the apparatus control device further includes a weather condition acquisition unit. The weather condition acquisition unit is configured to acquire a weather condition of an outdoor. The correction unit is configured to correct the thermal sensation calculated by the calculation unit, using the history of the metabolic amount before change stored in the metabolic amount storage unit, the elapsed time clocked by the clocking unit, and the weather condition acquired by the weather condition acquisition unit when the metabolic amount inputted to the input unit is changed.

Preferably, in the apparatus control device, the correction unit includes a first determination function and a second determination function. The first determination function is for determining whether or not an absolute value of an variation of the metabolic amount inputted to the input unit is more than or equal to a threshold. The second determination function is for determining a relationship of large and small size between the metabolic amount before change and the metabolic amount after change. In a case where the absolute value is more than or equal to the threshold, the correction unit is configured to correct the thermal sensation calculated by the calculation unit so as to increase the thermal sensation, and output a corrected thermal sensation to the apparatus control unit when the metabolic amount after change is less than the metabolic amount before change. The correction unit is configured to correct the thermal sensation calculated by the calculation unit so as to decrease the thermal sensation, and output a corrected thermal sensation to the apparatus control unit when the metabolic amount after change is more than the metabolic amount before change. In a case where the absolute value is less than the threshold, the correction unit is configured to output the thermal sensation calculated by the calculation unit without correcting to the apparatus control unit.

An apparatus control system according to the present invention includes the apparatus control device and the metabolic amount measurement device. The metabolic amount measurement device is configured to measure the metabolic amount.

A program according to the present invention is a program for causing a computer to function as a control content storage unit, an input unit, a calculation unit, a metabolic amount storage unit, a correction unit, and an apparatus control unit. The control content storage unit is configured to store thermal sensations in association with control contents of a heating-cooling combination apparatus. The input unit is configured to receive input of a metabolic amount measured by a metabolic amount measurement device. The calculation unit is configured to calculate a thermal sensation using the metabolic amount that is inputted to the input unit. The metabolic amount storage unit is configured to store a history of the metabolic amount inputted to the input unit before. The correction unit is configured to correct the thermal sensation calculated by the calculation unit using the history of the metabolic amount before change stored in the metabolic amount storage unit when the metabolic amount inputted to the input unit is changed. The apparatus control unit is configured to control the heating-cooling combination apparatus according to a control content stored in the control content storage unit in association with the thermal sensation that is corrected by the correction unit. The present invention is not limited to the program, and may be a computer-readable recording medium in which the above program is recorded.

According to the apparatus control device, the apparatus control system, and the program of the present invention, by predicting the thermal sensation of the user is predicted using the actual metabolic amount of the user of the heating-cooling combination apparatus. Therefore, it is possible to reflect the thermal sensation of the user to control of the heating-cooling combination apparatus while making remote control operation unnecessary.

According to the apparatus control device, the apparatus control system, and the program of the present invention, the thermal sensation is corrected using the history of the metabolic amount before change when the metabolic amount is changed. Therefore, it is possible to predict the thermal sensation more correctly.

BRIEF DESCRIPTION OF DRAWINGS

Preferred embodiments of the present invention will now be described in further details. Other features and advantages of the present invention will become better understood with regard to the following detailed description and accompanying drawings where:

FIG. 2A is a diagram illustrating elements of the PMV;

FIG. 2B is a diagram illustrating a relationship between the PMV and thermal sensations;

DESCRIPTION OF EMBODIMENTS

First Embodiment

Figure 1:
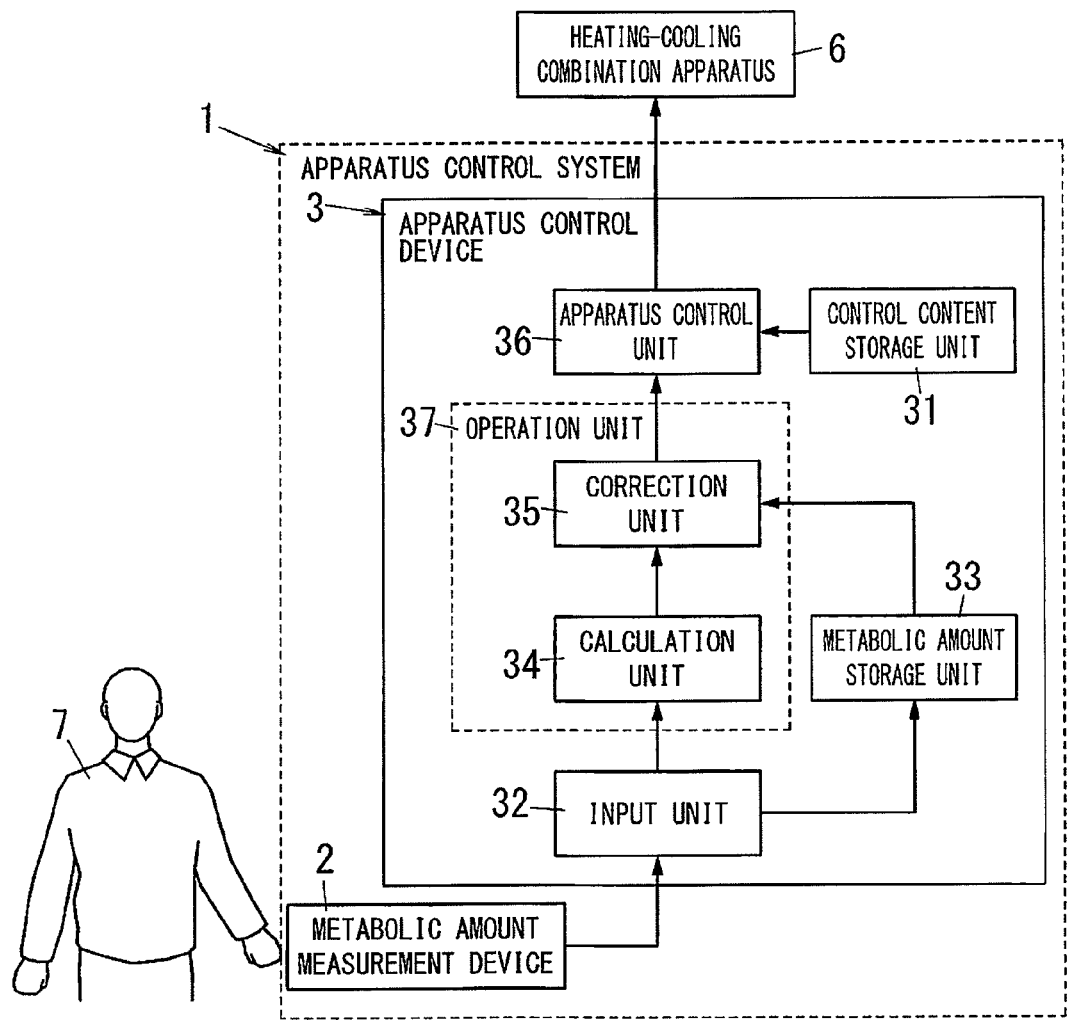
FIG. 1 is a configuration diagram of an apparatus control system according to a first embodiment.

An apparatus control system 1 according to a first embodiment includes, as shown in FIG. 1, a metabolic amount measurement device 2 that is configured to measure a metabolic amount, and an apparatus control device 3 that is configured to control a heating-cooling combination apparatus 6.

In the apparatus control system 1 of the present embodiment, the apparatus control device 3 is configured to calculate a thermal sensation of a user 7 against the heating-cooling combination apparatus 6 using a metabolic amounts measured in real time and the history of the thermal sensation before, and control the heating-cooling combination apparatus 6 according to the control content associated with the measured thermal sensation.

As an index showing the thermal sensation, the PMV (Predicted Mean Vote) defined by international standard ISO7730 of the International Organization for Standardization (ISO) is used. As shown in FIG. 2A, the PMV is a value predicted from six elements that are atmospheric temperature, mean radiant temperature, a wind speed, relative humidity, a clothing amount, and a metabolic amount. Since the formula and arithmetic method for calculating the PMV are publicly known by ISO7730, the description thereof is omitted. As shown in FIG. 2B, the PMV has a seven-step index. The degree that the user 7 feels hot becomes higher as the value of the PMV becomes larger. On the other hand, the degree that the user 7 feels cold becomes higher as the value of the PMV becomes lower. That the PMV is "0" denotes a level that the user 7 does not feel hot or cold.

The metabolic amount is an index showing the strength of people's activity or the strength of work, and makes chair seat quiet a standard (1.0 met). For example, the metabolic amount is 0.7 met in the case of sleeping, and is 2.0 met in the case of a flat road walking (3.2 km/h).

The heating-cooling combination apparatus 6 of the present embodiment is a collective term that refers to an apparatus that includes both a cooling function and a heating function, a cooling apparatus that includes only a cooling function, and a heating apparatus that includes only a heating function. The apparatus that includes both the cooling function and the heating function is a heating-cooling combination air-conditioner, for example. The cooling apparatus that includes only the cooling function is a cooling air-conditioner, for example. The heating apparatus that includes only the heating function is a floor heating apparatus or a fan heater, for example. The heating-cooling combination apparatus 6 is configured to control the thermal environment of an unshown predetermined indoor space.

The metabolic amount measurement device 2 shown in FIG. 1 is provided separately from the apparatus control device 3. The metabolic amount measurement device 2 is configured to measure the metabolic amount of a user 7, and output the measurement result to the apparatus control device 3. The metabolic amount measurement device 2 is a terminal unit, such as an active mass meter, a pedometer, or a multifunctional cellular phone, and measures the metabolic amount of the user 7 using the detection result of the acceleration sensor provided in this terminal unit.

The apparatus control device 3 is a device that is used with the metabolic amount measurement device 2, and instructs operations of the heating-cooling combination apparatus 6. The apparatus control device 3 includes a computer in which a CPU (Central Processing Unit) and a memory are incorporated as the main constituent elements, and is configured to execute each function by operating according to the program. The apparatus control device 3 includes a control content storage unit 31, an input unit 32, a metabolic amount storage unit 33, a calculation unit 34, a correction unit 35, and an apparatus control unit 36.

The control content storage unit 31 pre-stores, as a correspondence table, a correspondence relationship between thermal sensations and control contents of the heating-cooling combination apparatus 6.

In the correspondence table stored in the control content storage unit 31, the PMV is used as an index showing the thermal sensation. The PMV is divided into a plurality of ranges in this correspondence table, and a different control width (control content) is set for each range. In a case where the PMV is a positive number, the larger the PMV is, the larger the decrement width of the set temperature is. For example, when the PMV is "+2", the control width is "−2° C.". On the other hand, in a case where the PMV is a negative number, the lower the PMV is, the larger the increment width of the set temperature is. For example, when the PMV is "−1", the control width is "+1° C.".

The input unit 32 is configure to acquire the measurement result of the metabolic amount measurement device 2 from the metabolic amount measurement device 2 by wireless or a cable.

The metabolic amount storage unit 33 is configured to storage the history of the metabolic amount included in the measurement result inputted into the input unit 32 before (hereinafter referred to as a "history of the metabolic amount").

The calculation unit 34 is configured to calculate the PMV using the metabolic amount included in the measurement result inputted to the input unit 32 before, and atmospheric temperature, mean radiant temperature, a wind speed, relative humidity, and a clothing amount. Since the formula and the operation method of the PMV are publicly known, the description thereof is omitted. The calculation unit 34 may acquire five elements: the atmospheric temperature; the mean radiant temperature; the wind speed; the relative humidity; and the clothing amount, from other device (not shown). The calculation unit 34 may also acquire them by inputting of the user 7. The calculation unit 34 may include a means configured to measure the five elements: the atmospheric temperature; the mean radiant temperature; the wind speed; the relative humidity; and the clothing amount.

Figure 3:
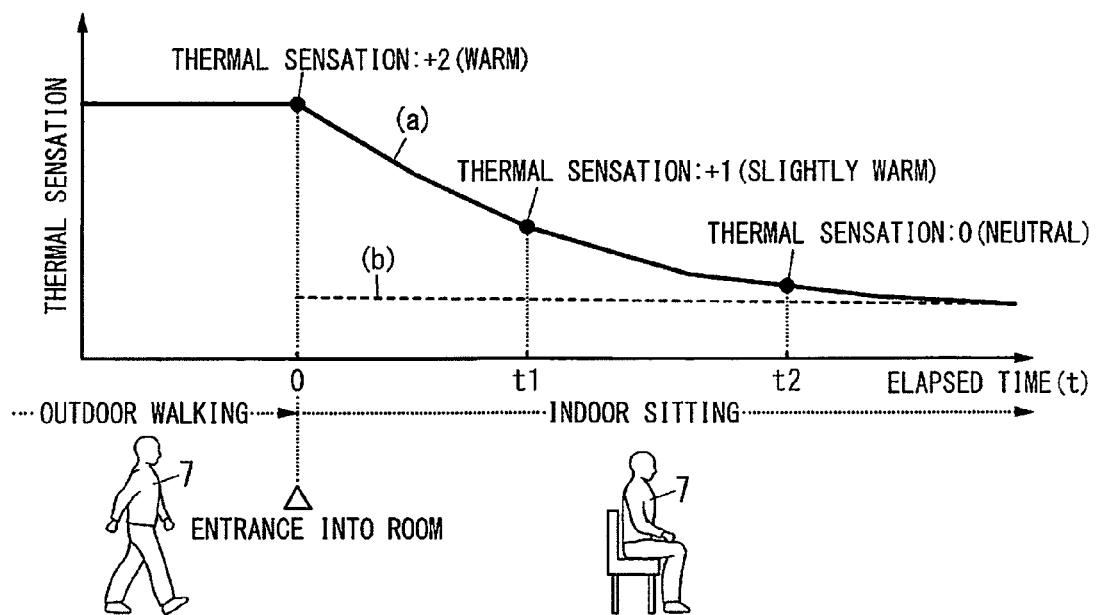
FIG. 3 is a drawing for describing operations of the apparatus control system according to the first embodiment.

Incidentally, as shown in FIG. 3, the PMV ((b) in FIG. 3) calculated by the calculation unit 34 may be largely different from an actual thermal sensation ((a) in FIG. 3). For this reason, when the heating-cooling combination apparatus 6 is controlled using the PMV calculated by the calculation unit 34 as it is, the actual thermal sensation may be unable to be precisely reflected in control of the heating-cooling combination apparatus 6.

For example, in the case where the user enters a cool indoor space after the user 7 has walked a hot outdoor in the summer, since an influence of outdoor walking exists immediately after entrance into a room (an elapsed time t=0), the actual thermal sensation of the user 7 ((a) in FIG. 3) becomes higher than a calculated value ((b) in FIG. 3). Then, when the user 7 maintains an indoor sitting condition, the thermal sensation falls gradually and becomes 0 at the elapsed time t=t2 as the elapsed time t becomes longer from t1 to t2. In the case where the influence of the outdoor walking is lost completely, the thermal sensation is substantially equal to the PMV (calculated value). Thus, the calculated value that is not reflecting the past activity tends to deviate from the actual thermal sensation in the transition stage of activities, such as movement.

Then, the correction unit 35 shown in FIG. 1 corrects the PMV calculated by the calculation unit 34 using the history of the metabolic amount before change stored in the metabolic amount storage unit 33, when the metabolic amount inputted to the input unit 32 is changed. The correction unit 35 includes: a first determining function for determining whether or not an absolute value of variation (the metabolic amount after change—the metabolic amount before change) of the metabolic amount inputted to the input unit 32 is more than or equal to a threshold; and a second determining function for determining a relationship of large and small size between the metabolic amount before change and the metabolic amount after change. The threshold used in the first determining function is a predetermined value. The calculation unit 34 and the correction unit 35 constitute the operation unit 37 that calculates the thermal sensation using the metabolic amount inputted to the input unit 32.

When the absolute value of the variation of the metabolic amount inputted to the input unit 32 is more than or equal to a threshold, the correction unit 35 performs the following correction and outputs the PMV (the modified PMV) after correction to the apparatus control unit 36. When the metabolic amount after change becomes smaller than the metabolic amount before change, the correction unit 35 corrects the PMV calculated by the calculation unit 34 so as to increase the PMV. That is, the relationship of large and small size between the modified PMV and the PMV before correction becomes the modified PMV>the PMV before correction. When the metabolic amount after change becomes more than the metabolic amount before change, the correction unit 35 corrects the PMV calculated by the calculation unit 34 so as to decrease the PMV. That is, the relationship between the modified PMV and the PMV before correction is the modified PMV<the PMV before correction. On the other hand, when the absolute value of the variation of the metabolic amount inputted to the input unit 32 is less than the threshold, the correction unit 35 outputs the PMV calculated by the calculation unit 34 to the apparatus control unit 36 as it is.

The apparatus control unit 36 is configured to compare the thermal sensation outputted from the correction unit 35 with the correspondence table stored in the control content storage unit 31, and extracts the control content matched with the above-mentioned thermal sensation from the above-mentioned correspondence table. The thermal sensation outputted to the apparatus control unit 36 from the correction unit 35 is the modified PMV when correction is performed by the correction unit 35, and the PMV calculated by the calculation unit 34 when the correction is not performed by the correction unit 35.

The apparatus control unit 36 is configured to generate a control signal so as to operate the heating-cooling combination apparatus 6 according to the control content extracted from the correspondence table, and output the generated control signal to the heating-cooling combination apparatus 6. The apparatus control unit 36 can thereby control the heating-cooling combination apparatus 6 according to the control content extracted from the correspondence table. In a case where the current set temperature is 27° C., for example, the apparatus control unit 36 extracts a control width of "−2° C." as the control content, and then outputs a control signal for a set temperature "25° C." to the heating-cooling combination apparatus 6. The heating-cooling combination apparatus 6, upon receiving the control signal from the apparatus control unit 36, changes the set temperature from 27° C. to 25° C. according to the received control signal.

As described above, the apparatus control device 3 can change the set temperature of the heating-cooling combination apparatus 6 depending on the thermal sensation of the user 7.

Figure 4:
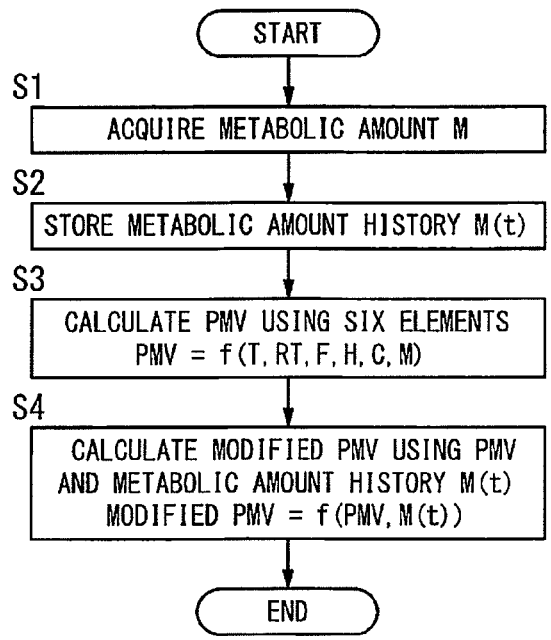
FIG. 4 is a flowchart illustrating the operations of the apparatus control system according to the first embodiment.

Next, operation of the apparatus control device 3 according to the present embodiment will be described with reference to FIG. 4. First, the input unit 32 acquires the metabolic amount M from the metabolic amount measurement device 2 (S1). The metabolic amount storage unit 33 stores the metabolic amount history M(t) including this metabolic amount M (S2). Then, the calculation unit 34 calculates the PMV [=f(T,RT,F,H,C,M)] from six elements (the atmospheric temperature T, the mean radiant temperature RT, the wind speed F, the relative humidity H, the clothing amount C, the metabolic amount M) (S3). Then, the correction unit 35 calculates the modified PMV [=f(PMV, M(t))] by correcting the PMV using the metabolic amount history M(t) (S4).

Incidentally, the apparatus control device 3 stores a program so that the apparatus control device 3 performs various kinds of functions. That is, the apparatus control device 3 stores the program for causing the apparatus control device 3 to function as the control content storage unit 31, the input unit 32, the metabolic amount storage unit 33, the calculation unit 34, the correction unit 35, and the apparatus control unit 36. The above-described program is pre-stored at the time of shipping the apparatus control device 3. However, in a case where the apparatus control device 3 acquires the above program after shipment, an example of a method for acquiring the above program is to use a computer-readable recording medium in which the above program is recorded. In the case of the method using the recording medium, the apparatus control device 3 may include a reading device (not shown) to read data in the recording medium. Examples of the recording medium include an optical disk and a memory card. Examples of the reading device include a drive device configured to read out information of the optical disk, and a memory card reader configured to read out information of the memory card. Similarly, another method for the apparatus control device 3 to acquire the above program is to download the above program from another device (server, for example) using a network. In the case of the method in which the above program is downloaded, the apparatus control device 3 may include a communication function for communicating with another device using the network.

In the apparatus control device 3, the input unit 32 acquires the metabolic amount of the user 7 of the heating-cooling combination apparatus 6 in real time, and, as for the apparatus control system 1 of the present embodiment described above, the operation unit 37 predicts the thermal sensation of the user 7 using this metabolic amount. Accordingly, the thermal sensation of the user 7 can be reflected in the control of the heating-cooling combination apparatus 6 while making remote control operation unnecessary.

According to the apparatus control system 1 of the present embodiment, when the metabolic amount inputted to the input unit 32 is changed, the correction unit 35 corrects the thermal sensation calculated by the calculation unit 34 using the metabolic amount history before change stored in the metabolic amount storage unit 33. Therefore, the thermal sensation can be predicted more correctly.

Second Embodiment

An apparatus control system 1 according to a second embodiment is different from the apparatus control system 1 according to the first embodiment in that entering of a user 7 into a room is detected, and the thermal sensation is corrected in consideration of an elapsed time from the time of the entrance into a room. About the same component as the apparatus control system 1 of the first embodiment, the same code is attached and a description thereof is omitted.

Figure 5:
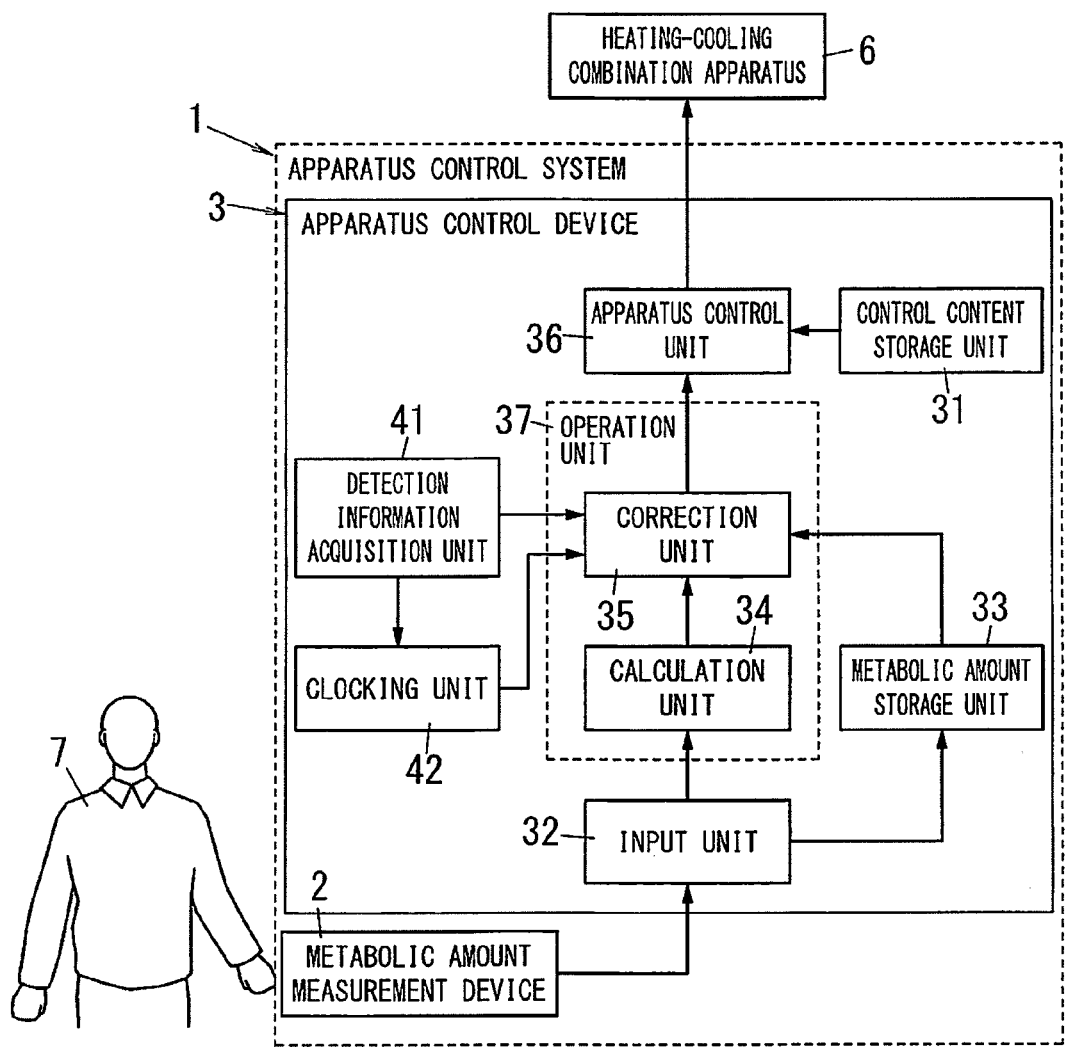
FIG. 5 is a configuration diagram of an apparatus control system according to a second embodiment.

An apparatus control device 3 of the present embodiment, as shown in FIG. 5, further includes a detection information acquisition unit 41 and a clocking unit 42. A description is omitted about the same function as the apparatus control device 3 (refer to FIG. 1) of the first embodiment.

The detection information acquisition unit 41 is configured to acquire presence/absence information (detection information) including a detection result of whether or not a person exists in an indoor space where a thermal environment is changed by a heating-cooling combination apparatus 6. Examples of a means configured to acquire the presence/absence information include a human detection means (human detection sensor or door knob sensor, for example) that are provided by the indoor space and detects a person that exists in the above-mentioned indoor space, a presence/absence information input means configured to receive the input of the presence/absence information. Examples of the presence/absence information input means include a means configured to receive the presence/absence information from an external device (not shown), and a means configured to acquire the presence/absence information by the user 7 entering. Examples of an input device used when the user 7 inputs the presence/absence information include a keyboard, plural manual operation buttons, and a touch panel.

The clocking unit 42 is configured to clock an elapsed time from a time at which presence of the person of the indoor space is detected using the presence/absence information acquired by the detection information acquisition unit 41.

When the metabolic amount inputted to the input unit 32 is changed, the correction unit 35 of the present embodiment is configured to correct the PMV calculated by the calculation unit 34 using the metabolic amount history before change stored in the metabolic amount storage unit 33, and the elapsed time clocked by the clocking unit 42. Specifically, the correction unit 35 makes a correction width of the PMV calculated by the calculation unit 34 smaller as the elapsed time becomes longer. A description is omitted about the same function as the correction unit 35 (refer to FIG. 1) of the first embodiment.

Figure 6:
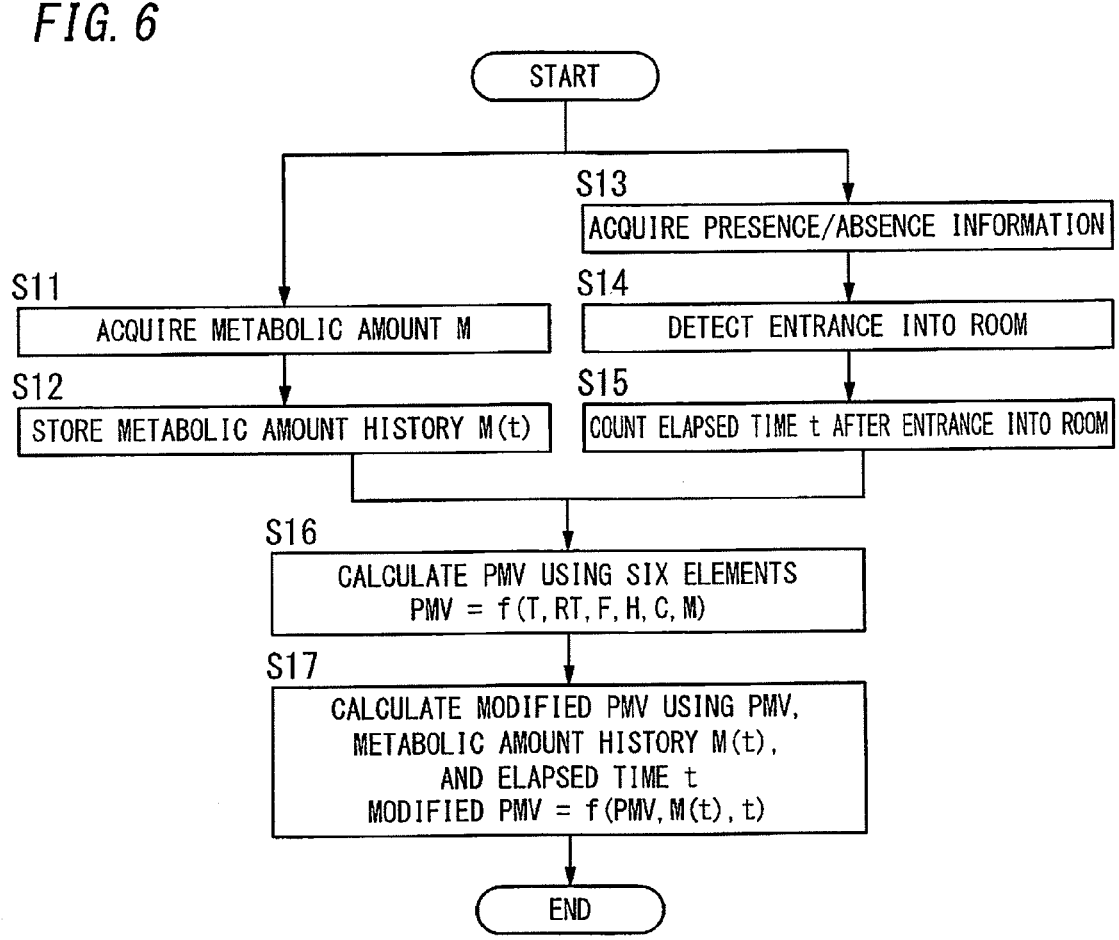
FIG. 6 is a flowchart illustrating operations of the apparatus control system according to the second embodiment.

Next, operation of the apparatus control device 3 according to the present embodiment will be described with reference to FIG. 6. First, the input unit 32 acquires the metabolic amount M from the metabolic amount measurement device 2 (S11). The metabolic amount storage unit 33 stores the metabolic amount history M(t) including this metabolic amount M (S12). On the other hand, the detection information acquisition unit 41 acquires presence/absence information (S13), and detects the user 7 entering into a room (S14). The clocking unit 42 counts the elapsed time t after entrance into a room (S15). Then, the calculation unit 34 calculates the PMV [=f(T,RT,F,H,C,M)] from six elements (the atmospheric temperature T, the mean radiant temperature RT, the wind speed F, the relative humidity H, the clothing amount C, the metabolic amount M) (S16). Then, the correction unit 35 calculates the modified PMV [=f(PMV,M(t),t)] by correcting the PMV using the metabolic amount history M(t) and the elapsed time t (S17).

According to the apparatus control system 1 of the present embodiment described above, in the apparatus control device 3, the clocking unit 42 clocks the elapsed time from the time of the entrance of the user 7 into the indoor space where the thermal environment is changed by the heating-cooling combination apparatus 6. Therefore, the thermal sensation is corrected in consideration of the entrance of the user 7 and the elapsed time from the time of the entrance into the indoor space. As a result, it is possible to control the heating-cooling combination apparatus 6 exactly.

Also in the present embodiment, the apparatus control device 3 holds the program for the apparatus control device 3 to perform various kinds of functions like the first embodiment, namely, the apparatus control device 3 of the present embodiment stores the program for making it function as the control content storage unit 31, the input unit 32, the metabolic amount storage unit 33, the calculation unit 34, the correction unit 35, the apparatus control unit 36, the detection information acquisition unit 41, and the clocking unit 42.

Third Embodiment

An apparatus control system 1 according to a third embodiment is different from the apparatus control system 1 according to the second embodiment in that the thermal sensation is corrected in consideration of the history of an outdoor weather condition. About the same component as the apparatus control system 1 of the second embodiment, the same code is attached and a description is omitted.

Figure 7:
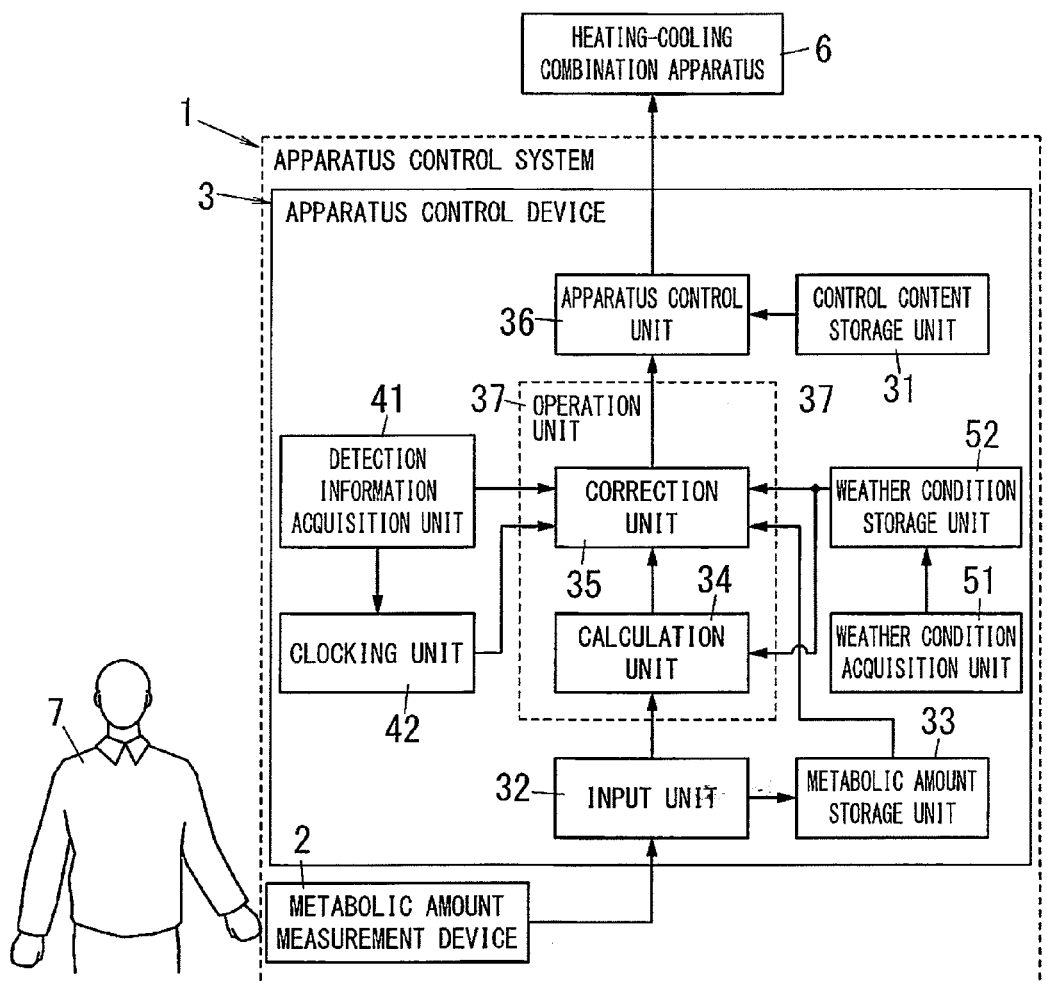
FIG. 7 is a configuration diagram of an apparatus control system according to a third embodiment.

As shown in FIG. 7, an apparatus control device 3 of the present embodiment is further includes a weather condition acquisition unit 51 and a weather condition storage unit 52. A description is omitted about the same function as the apparatus control device 3 (refer to FIG. 5) of the second embodiment.

The weather condition acquisition unit 51 is configured to acquire a present weather condition of the outdoors. As the weather condition, there are outside air temperature, humidity, a wind speed, or the weather, for example. There are, as the means to acquire the weather condition, a measurement means (temperature sensor, for example) that are provided by the outdoors and measure the outdoor present weather condition, a weather-condition input means that receives the input of the outdoor present weather condition, or a prediction means that predicts the outdoor present weather condition from a calendar, for example. There are, as the weather-condition input means, a means configured to receive the weather condition from the external device (server, for example) that is not illustrated, or a means configured to acquire the weather condition when the user 7 inputs the present weather condition, for example. As an input device (not shown) used when the user 7 inputs the present weather condition, there are a keyboard, two or more manual operation buttons, a touch panel, for example.

The weather condition storage unit 52 is configured to store the history (hereinafter referred to as a "weather condition history") of the weather condition acquired so far by the weather condition acquisition unit 51.

When the metabolic amount inputted to an input unit 32 changes, a correction unit 35 of the present embodiment is configured to correct the PMV calculated by a calculation unit 34 using the metabolic amount history before change, the elapsed time, and the weather condition history stored in the weather condition storage unit 52. Specifically, when the weather condition is outside air temperature and the metabolic amount after change becomes smaller than the metabolic amount before change, the correction unit 35 is configured to correct the correction width of the PMV calculated by the calculation unit 34 so as to become larger as the outside air temperature is higher. A description is omitted about the same function as the correction unit 35 (refer to FIG. 5) of the second embodiment.

Figure 8:
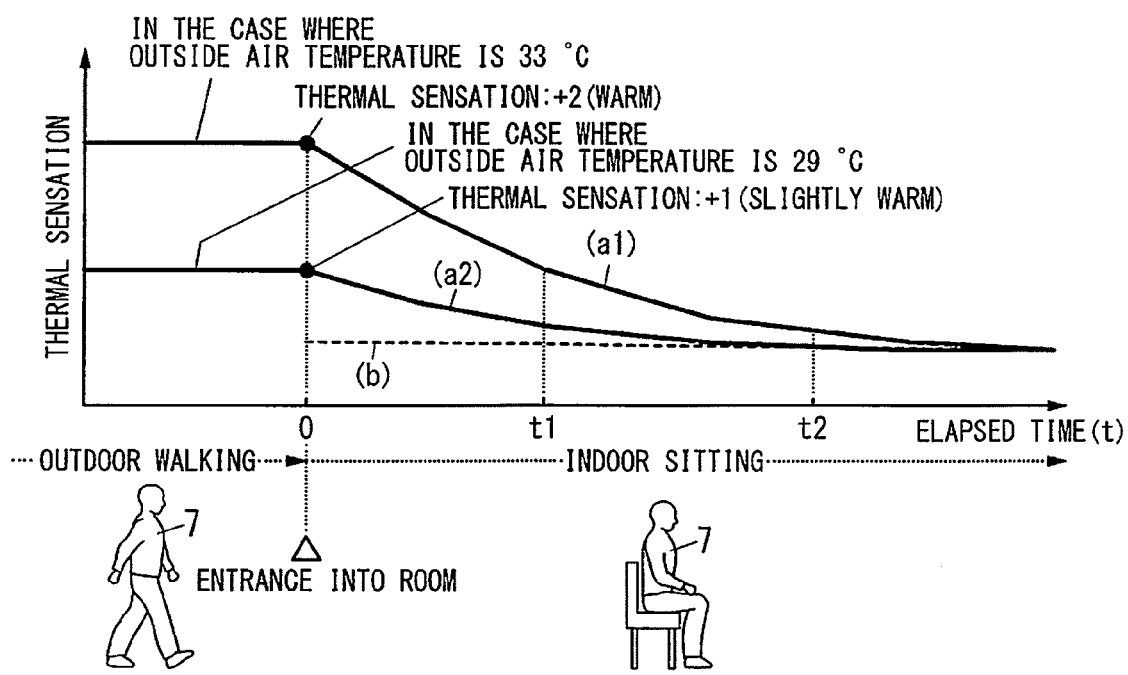
FIG. 8 is a drawing for describing operations of the apparatus control system according to the third embodiment.

As shown in FIG. 8, the actual thermal sensation of the user 7 changes largely due to the outside air temperature, for example. In the example of FIG. 8, the thermal sensation immediately after entrance into a room (elapsed time t=0) in the case where the outside air temperature is 33° C. ((a1) in FIG. 8) is higher than that of the case where the outside air temperature is 29° C. ((a2) in FIG. 8).

For example, when the user enters the cool indoor space after walking the hot outdoor in the summer, since the influence of the outdoor walking immediately after entrance into a room exists, the actual thermal sensation of the user 7 ((a1) and (a2) in FIG. 8) becomes higher than a calculated value ((b) in FIG. 8). Here, the degree out of which thermal sensation more highly changes with outdoor weather conditions. Specifically, the thermal sensation immediately after entrance into a room when the outside temperature is high is more than the thermal sensation immediately after entrance into a room when the outside temperature is low even if the environment of the indoor space and the metabolic amount of the user 7 (the time of outdoor walking, the time of indoor seating) are the same condition, the outside air temperature is higher becomes high. For example, the thermal sensation immediately after entrance into a room is +2 when the outside air temperature is 33° C. On the other hand, the thermal sensation is +1 when the outside air temperature is 29° C.

Figure 9:
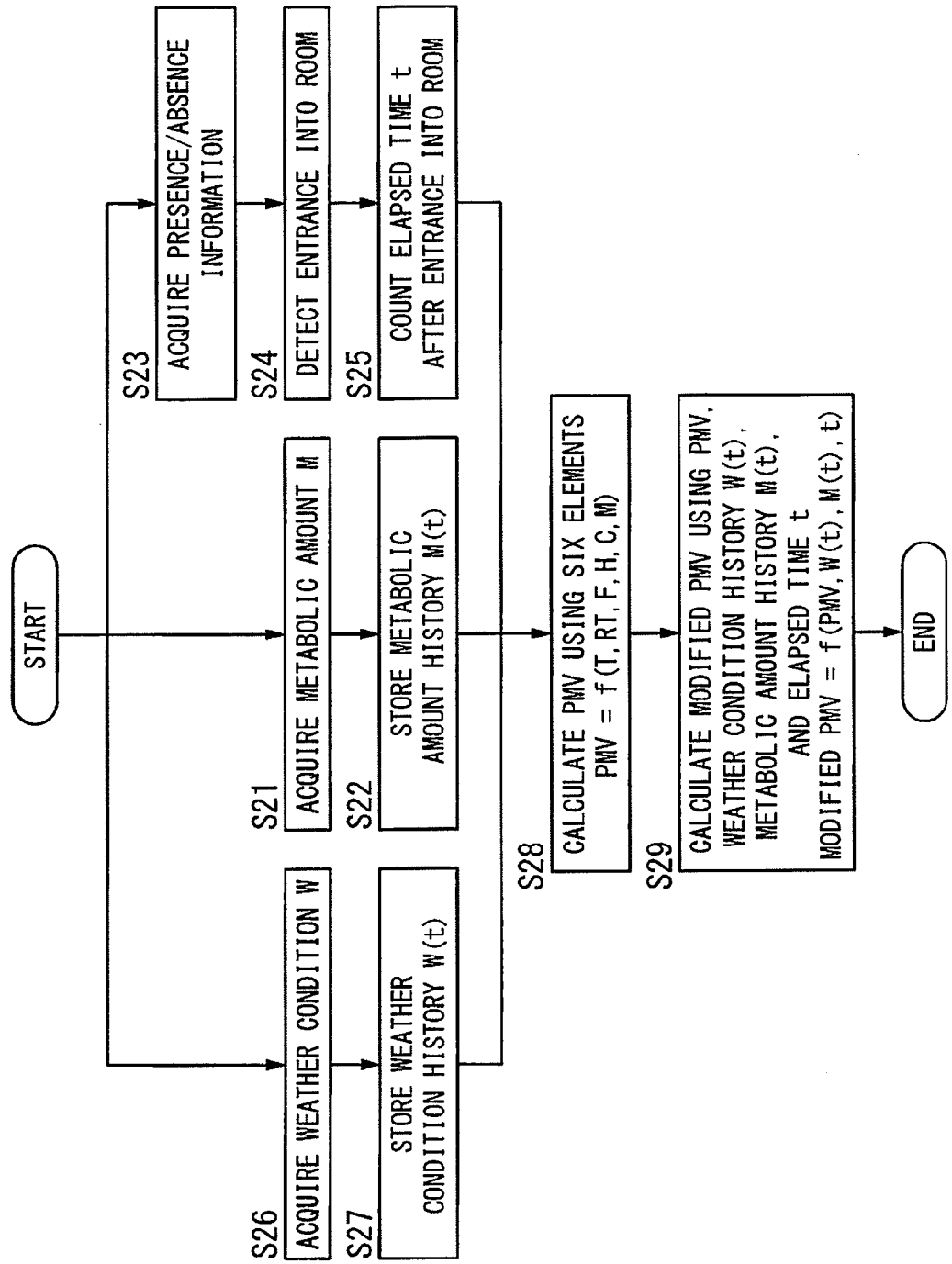
FIG. 9 is a flowchart illustrating the operations of the apparatus control system according to the third embodiment.

Next, operation of the apparatus control device 3 according to the present embodiment will be described with reference to FIG. 9. First, the input unit 32 acquires the metabolic amount M from the metabolic amount measurement device 2 (S21). The metabolic amount storage unit 33 stores the metabolic amount history M(t) including this metabolic amount M (S22). On the other hand, the detection information acquisition unit 41 acquires presence/absence information (S23), and detects the user 7 entering into a room (S24). The clocking unit 42 counts the elapsed time t after entrance into a room (S25). The weather condition acquisition unit 51 acquires the outdoor weather condition W (S26). Then, the weather condition storage unit 52 stores the weather-condition history W(t) including this weather condition W (S27). Then, the calculation unit 34 calculates the PMV (=f(T,RT,F,H,C,M)) from six elements (the atmospheric temperature T, the mean radiant temperature RT, the wind speed F, the relative humidity H, the clothing amount C, the metabolic amount M) (S28). Then, the correction unit 35 calculates the modified PMV (=f(PMV,W(t) M(t),t)) by correcting the PMV using the metabolic amount history M(t), the elapsed time t, and the weather condition history W(t) (S29).

In the apparatus control system 1 of the present embodiment described above, the correction unit 35 corrects the thermal sensation using the weather condition of the outdoors acquired by the weather condition acquisition unit 51. Therefore the thermal sensation can be predicted more correctly.

Also in the present embodiment, the apparatus control device 3 includes a program for causing the apparatus control device 3 to perform various kinds of functions, like the second embodiment. That is, the apparatus control device 3 of the present embodiment stores the program for causing the apparatus control device 3 to function as the control content storage unit 31, the input unit 32, the metabolic amount storage unit 33, the calculation unit 34, the correction unit 35, the apparatus control unit 36, the detection information acquisition unit 41, the clocking unit 42, the weather condition acquisition unit 51, and the weather condition storage unit 52.

In each embodiment, since the metabolic amount measurement device 2 is provided in a terminal separate from the apparatus control device 3, a general-purpose terminal having a metabolic amount measurement function can be used as the metabolic amount measurement device 2, for example. As a result, it is possible to reduce the initial cost of the system.

Although the present invention has been described with reference to a certain preferred embodiment, numerous modifications and variations can be made by those skilled in the art without departing from the true spirit and scope of this invention, namely claims.

The invention claimed is:

1. An apparatus control device comprising a processor and memory for controlling a heating-cooling combination apparatus and that is used together with a metabolic amount measurement device configured to measure a metabolic amount of a user of the heating-cooling combination apparatus, the apparatus control device comprising:
    a control content storage unit configured to store and associate thermal sensations of the user with control contents of the heating-cooling combination apparatus;
    an input unit configured to receive input of the metabolic amount measured by the metabolic amount measurement device;
    an operation unit configured to calculate a thermal sensation using the metabolic amount that is inputted to the input unit;
    an apparatus control unit configured to control the heating-cooling combination apparatus according to a control content stored in the control content storage unit in association with the thermal sensation that is calculated by the operation unit; and
    a metabolic amount storage unit configured to store a history of the metabolic amount inputted to the input unit,
    wherein the operation unit comprises:
    a calculation unit configured to calculate the thermal sensation using the metabolic amount inputted to the input unit;
    a correction unit configured to correct the thermal sensation calculated by the calculation unit using the history of the metabolic amount before change stored in the metabolic amount storage unit when the metabolic amount inputted to the input unit is changed.

2. The apparatus control device according to claim 1, further comprising:
    a detection information acquisition unit configured to acquire detection information that denotes whether or not the user exists in an indoor space in which a thermal environment is changed by the heating-cooling combination apparatus; and
    a clocking unit configured to clock an elapsed time from a time at which a presence of the user in the indoor space is detected using the detection information acquired by the detection information acquisition unit,
    wherein the correction unit is configured to correct the thermal sensation calculated by the calculation unit, using the history of the metabolic amount before change stored in the metabolic amount storage unit and the elapsed time clocked by the clocking unit when the metabolic amount inputted to the input unit is changed.

3. The apparatus control device according to claim 2, further comprising:

a weather condition acquisition unit configured to acquire a weather condition of an outdoor, wherein the correction unit is configured to correct the thermal sensation calculated by the calculation unit, using the history of the metabolic amount before change stored in the metabolic amount storage unit, the elapsed time clocked by the clocking unit, and the weather condition acquired by the weather condition acquisition unit when the metabolic amount inputted to the input unit is changed.

4. The apparatus control device according to claim 1, wherein the correction unit comprises:
    a first determination function for determining whether or not an absolute value of an variation of the metabolic amount inputted to the input unit is more than or equal to a threshold; and
    a second determination function for determining a relationship between the metabolic amount before change and the metabolic amount after change,
    wherein, in a case where the absolute value is more than or equal to the threshold, the correction unit is configured to correct the thermal sensation calculated by the calculation unit so as to increase the thermal sensation, and output a corrected thermal sensation to the apparatus control unit when the metabolic amount after change is less than the metabolic amount before change,
    the correction unit being configured to correct the thermal sensation calculated by the calculation unit so as to decrease the thermal sensation, and output a corrected thermal sensation to the apparatus control unit when the metabolic amount after change is more than the metabolic amount before change, and
    wherein, in a case where the absolute value is less than the threshold, the correction unit is configured to output the thermal sensation calculated by the calculation unit without correcting to the apparatus control unit.

5. An apparatus control system comprising:
    the apparatus control device according to claim 1; and
    the metabolic amount measurement device configured to measure the metabolic amount.

6. A non-transitory computer-readable recording medium containing a program for causing a computer to function as:
    a control content storage unit configured to store and associate thermal sensations of a user of a heating-cooling combination apparatus with control contents of the heating-cooling combination apparatus;
    an input unit configured to receive input of a metabolic amount of the user measured by a metabolic amount measurement device;
    a calculation unit configured to calculate a thermal sensation using the metabolic amount that is inputted to the input unit;
    a metabolic amount storage unit configured to store a history of the metabolic amount inputted to the input unit;
    a correction unit configured to correct the thermal sensation calculated by the calculation unit using the history of the metabolic amount before change stored in the metabolic amount storage unit when the metabolic amount inputted to the input unit is changed; and
    an apparatus control unit configured to control the heating-cooling combination apparatus according to a control content stored in the control content storage unit in association with the thermal sensation that is corrected by the correction unit.

7. The apparatus control device according to claim 2, wherein the correction unit comprises:
- a first determination function for determining whether or not an absolute value of an variation of the metabolic amount inputted to the input unit is more than or equal to a threshold; and
- a second determination function for determining a relationship between the metabolic amount before change and the metabolic amount after change,
- wherein, in a case where the absolute value is more than or equal to the threshold, the correction unit is configured to correct the thermal sensation calculated by the calculation unit so as to increase the thermal sensation, and output a corrected thermal sensation to the apparatus control unit when the metabolic amount after change is less than the metabolic amount before change,
- the correction unit being configured to correct the thermal sensation calculated by the calculation unit so as to decrease the thermal sensation, and output a corrected thermal sensation to the apparatus control unit when the metabolic amount after change is more than the metabolic amount before change, and
- wherein, in a case where the absolute value is less than the threshold, the correction unit is configured to output the thermal sensation calculated by the calculation unit without correcting to the apparatus control unit.

8. The apparatus control device according to claim 3, wherein the correction unit comprises:
- a first determination function for determining whether or not an absolute value of an variation of the metabolic amount inputted to the input unit is more than or equal to a threshold; and
- a second determination function for determining a relationship between the metabolic amount before change and the metabolic amount after change,
- wherein, in a case where the absolute value is more than or equal to the threshold, the correction unit is configured to correct the thermal sensation calculated by the calculation unit so as to increase the thermal sensation, and output a corrected thermal sensation to the apparatus control unit when the metabolic amount after change is less than the metabolic amount before change,
- the correction unit being configured to correct the thermal sensation calculated by the calculation unit so as to decrease the thermal sensation, and output a corrected thermal sensation to the apparatus control unit when the metabolic amount after change is more than the metabolic amount before change, and
- wherein, in a case where the absolute value is less than the threshold, the correction unit is configured to output the thermal sensation calculated by the calculation unit without correcting to the apparatus control unit.

9. An apparatus control system comprising:

the apparatus control device according to claim 2; and the metabolic amount measurement device configured to measure the metabolic amount.

10. An apparatus control system comprising:

the apparatus control device according to claim 3; and the metabolic amount measurement device configured to measure the metabolic amount.

11. An apparatus control system comprising:

the apparatus control device according to claim 4; and the metabolic amount measurement device configured to measure the metabolic amount.

12. An apparatus control system comprising:

the apparatus control device according to claim 7; and the metabolic amount measurement device configured to measure the metabolic amount.

13. An apparatus control system comprising:

the apparatus control device according to claim 8; and the metabolic amount measurement device configured to measure the metabolic amount.

* * * * *